United States Patent
Abe et al.

(10) Patent No.: US 10,071,794 B2
(45) Date of Patent: Sep. 11, 2018

(54) JOINT, AND AIRCRAFT STRUCTURE

(71) Applicant: MITSUBISHI HEAVY INDUSTRIES, LTD., Tokyo (JP)

(72) Inventors: Toshio Abe, Tokyo (JP); Kiyoka Takagi, Tokyo (JP); Takayuki Koyama, Tokyo (JP); Kazuaki Kishimoto, Tokyo (JP); Kouichi Saito, Aichi (JP); Takashi Ishida, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 82 days.

(21) Appl. No.: 14/908,743

(22) PCT Filed: May 20, 2014

(86) PCT No.: PCT/JP2014/063384
§ 371 (c)(1),
(2) Date: Jan. 29, 2016

(87) PCT Pub. No.: WO2015/049895
PCT Pub. Date: Apr. 9, 2015

(65) Prior Publication Data
US 2016/0244140 A1    Aug. 25, 2016

(30) Foreign Application Priority Data

Oct. 2, 2013  (JP) ................................ 2013-207663

(51) Int. Cl.
*B64C 1/06*     (2006.01)
*B29C 65/48*    (2006.01)
(Continued)

(52) U.S. Cl.
CPC ................ *B64C 1/06* (2013.01); *B29C 65/48* (2013.01); *B29C 65/7808* (2013.01);
(Continued)

(58) Field of Classification Search
CPC .......... B29C 66/43441; B29C 65/7814; B29C 65/7808; B29C 66/12441; B29C 66/12443; B64C 1/06
See application file for complete search history.

(56) References Cited

U.S. PATENT DOCUMENTS 4,671,470 A * 6/1987 Jonas .................. B29C 65/5071
244/119
5,474,635 A * 12/1995 Jacob .................. B29C 37/0082
156/163

(Continued)

FOREIGN PATENT DOCUMENTS

| CN | 102239044 | 11/2011 |
|---|---|---|
| CN | 202244075 | 5/2012 |

(Continued)

OTHER PUBLICATIONS

Decision to Grant a Patent dated Jan. 10, 2017 in corresponding Japanese Application No. 2013-207663 (with English translation).
(Continued)

*Primary Examiner* — Brian M O'Hara
*Assistant Examiner* — Michael B Kreiner
(74) *Attorney, Agent, or Firm* — Wenderoth, Lind & Ponack, L.L.P.

(57) ABSTRACT

Provided is a joint and an aircraft structure wherein it is possible to position a member relative to a preform with high accuracy. A groove into which a plate member (30) is inserted is formed in a pi-shaped joint (20) provided on the preform (21), and the preform (21) and the plate member (30) are connected by being bonded. Moreover, a fitting shape (32A-1) into which the plate member (30) is fitted is formed on the pi-shaped joint (20) on the whole groove bottom face. Additionally, a fitting shape (32A-2) into which the plate member (30) is fitted is formed on a portion of the groove bottom face. Furthermore, fitting shapes (32B-1, (Continued)

32B-2), into which the groove bottom face that is formed on the pi-shaped joint (20) is fitted, are formed on the surface of the plate material (30) that is fitted with the pi-shaped joint (20).

8 Claims, 6 Drawing Sheets (51) Int. Cl.
| | | |
|---|---|---|
| *F16B 11/00* | (2006.01) | |
| *B29C 65/78* | (2006.01) | |
| *B29C 65/00* | (2006.01) | |
| *B29L 31/30* | (2006.01) | |
| *B29K 307/04* | (2006.01) | |

(52) U.S. Cl.
CPC .... *B29C 65/7814* (2013.01); *B29C 66/12441* (2013.01); *B29C 66/12443* (2013.01); *B29C 66/43441* (2013.01); *F16B 11/006* (2013.01); *B29C 66/12449* (2013.01); *B29C 66/7212* (2013.01); *B29K 2307/04* (2013.01); *B29L 2031/3076* (2013.01)

(56) References Cited

U.S. PATENT DOCUMENTS

| | | | |
|---|---|---|---|
| 6,374,570 B1 * | 4/2002 | McKague, Jr. ......... | B29C 65/56 52/156 |
| 6,749,155 B2 | 6/2004 | Bergmann | |
| 6,849,150 B1 * | 2/2005 | Schmidt .............. | B29C 65/5071 156/285 |
| 6,863,767 B2 * | 3/2005 | Bersuch ............ | B29C 66/43441 156/286 |
| 7,037,568 B1 * | 5/2006 | Rogers ................ | B29C 65/5057 244/131 |
| 7,205,066 B1 | 4/2007 | Hammi et al. | |
| 7,393,488 B2 * | 7/2008 | Grose ................... | B29C 65/527 264/254 |
| 7,555,873 B2 | 7/2009 | Kilwin et al. | |
| 7,670,527 B2 * | 3/2010 | Malis .................... | B29C 65/542 156/293 |
| 7,914,223 B2 | 3/2011 | Wood et al. | |
| 8,082,667 B2 * | 12/2011 | Kulesha .................... | B64C 1/06 244/131 |
| 8,272,618 B2 | 9/2012 | Kilwin et al. | |
| 8,393,871 B2 | 3/2013 | Yarbrough | |
| 8,403,586 B2 | 3/2013 | Wood et al. | |
| 8,985,515 B2 * | 3/2015 | McCullough ........ | B29D 99/001 244/131 |
| 9,017,510 B2 * | 4/2015 | Hansen ................. | B64F 5/0009 156/285 |
| 9,073,267 B1 * | 7/2015 | Badgley ................ | B29C 65/542 |
| 2011/0123254 A1 | 5/2011 | Wood et al. | |
| 2011/0236641 A1 | 9/2011 | Brambrink et al. | |
| 2012/0027612 A1 | 2/2012 | Yarbrough | |
| 2012/0114882 A1 | 5/2012 | Kornmeyer | |
| 2012/0135300 A1 * | 5/2012 | Ota ...................... | H01M 2/1061 429/176 |
| 2012/0255176 A1 | 10/2012 | Flesch et al. | |
| 2013/0298357 A1 | 11/2013 | Goehlich et al. | |
| 2014/0293497 A1 * | 10/2014 | Foltz ......................... | H05F 3/00 361/218 |

FOREIGN PATENT DOCUMENTS

| | | |
|---|---|---|
| DE | 10 2010 064 060 | 6/2012 |
| FR | 2 954 200 | 6/2011 |
| JP | 2002-21443 | 1/2002 |
| JP | 2004-216672 | 8/2004 |
| JP | 2004-251091 | 9/2004 |
| JP | 2012-528994 | 11/2012 |
| JP | 2013-527359 | 6/2013 |
| RU | 103 588 | 4/2011 |

OTHER PUBLICATIONS

Extended European Search Report dated Jun. 15, 2016 in corresponding European Patent Application No. 14851380.7.
International Search Report dated Jun. 17, 2014 in corresponding International Application No. PCT/JP2014/063384.
Written Opinion of the International Searching Authority dated Jun. 17, 2014 in corresponding International Application No. PCT/JP2014/063384.
The First Office Action dated Aug. 23, 2016 in corresponding Chinese Application No. 201480043091.5 (with English translation).

* cited by examiner

JOINT, AND AIRCRAFT STRUCTURE

TECHNICAL FIELD

The present invention relates to a joint, and an aircraft structure.

BACKGROUND ART

In the aviation field, the range of application of composite materials such as, for example, carbon fiber reinforced plastics (CFRP) has extended to the primary structure. Also, utilizing the advantage of light weight of composite materials, it is desirable that joints do not use fasteners, in order to achieve weight reduction of the structure.

The so-called pi ($\pi$) shaped joint in which a groove is formed and a member (for example a plate member) is inserted into the groove is an example of a joint.

A plate member inserted into the joint is bonded using adhesive, and the joint is also bonded to a preform using adhesive. In this way, plate members are connected to a preform.

Also, when assembling the structure, plate members that are joined to the preform must be positioned with high accuracy. In other words, if the joint is provided in advance on the preform, it is necessary to position the plate member with respect to the joint with high accuracy.

In Patent Document 1, a peg (projection) for positioning is provided on a side face of a plate member, and a slot into which the peg is fitted is provided on a side face of a joint, and positioning is carried out by inserting the plate member so that the peg of the plate member is fitted into the slot of the joint.

CITATION LIST

Patent Literature

Patent Document 1: U.S. Pat. No. 8,403,586

SUMMARY OF INVENTION

Technical Problem

However, in the configuration disclosed in Patent Document 1, it is necessary to provide the projection in the side face of the plate member, and provide the slot in the side face of the joint, so the number of assembly operations is increased. Also providing the slot is not desirable from the point of view of strength.

With the foregoing in view, it is an object of the present invention to provide a joint and an aircraft structure that enables a member to be positioned relative to a preform without increasing the number of assembly operations and without reducing the strength.

Solution to Problem

In order to solve the problem described above, the joint and the aircraft structure according to the present invention utilize the following means.

The joint according to a first aspect of the present invention is provided on a preform, has a groove formed therein into which a member is inserted, and is for connecting the preform and the member by bonding. A first fitting shape into which the member fits is formed on the whole face of the bottom face of the groove.

The joint according to this aspect is provided on a preform, has a groove formed therein into which a member is inserted, and is for connecting the preform and the member by bonding. Note that the member is, for example, a plate member. The member is bonded to the joint by filling the gap between the member and the groove with adhesive. Also, the joint is bonded to the preform with, for example, adhesive.

It is necessary that the member inserted into the joint is positioned with good accuracy.

Also, a first fitting shape into which the member fits is formed on the whole face of the bottom face of the groove. In other words, a fitting shape into which the first fitting shape fits is also formed on the member, and the first fitting shape on the bottom face of the groove is fitted with the fitting shape of the member. In this way, the member is fitted only in the position that corresponds with the first fitting shape.

Note that the first fitting shape is a shape that is symmetrical with respect to the center of the groove width as axis, or a shape that is asymmetrical.

Therefore, according to the aspect as described above, the member can be positioned with high accuracy with respect to the preform, without increasing the number of assembly processes, and without reducing the strength.

In the aspect as described above, a second fitting shape into which the member fits is formed on a portion of the bottom face of the groove.

According to this aspect, the second fitting shape is the standard position for positioning the member with respect to the longitudinal direction of the groove, so the member can be positioned in the required position with respect to the longitudinal direction of the groove. The shape of the second fitting shape is, for example, a protrusion shape or a slot shape.

In the first aspect as described above, the first fitting shape may be formed so that the position of the member is a prescribed position with respect to the groove width.

According to this aspect, the member can be positioned in the prescribed position with respect to the groove width. The prescribed position is a position in which, for example, the member does not touch the two faces that form the groove, such as the center of the groove width.

In the first aspect as described above, the joint may include: a main body member in which the groove is formed; and a positioning member having the fitting shape formed on a top face thereof, and the positioning member is arranged in the main body member so that the top face thereof is a bottom face of the groove, and the member is connected at the top face.

According to this aspect, the joint is a so-called pi-shaped joint in which the groove is formed, the member is connected to the groove, and the fitting shape is formed in advance by the positioning member. Note that the main body member may be configured as separate from the positioning member, or it may be formed integrally therewith.

The joint according to a second aspect of the present invention is a joint provided on a preform, has a groove formed therein into which a member is inserted, and is for connecting the preform and the member by bonding. A first fitting shape is formed on a bottom face of the groove to position the member with respect to the width direction of the groove.

In the second aspect as described above, a second fitting shape is formed on the bottom face of the groove to position the member with respect to the longitudinal direction of the groove.

The aircraft structure according to a third aspect of the present invention includes: the joint as described above; and a member in which a fitting shape is formed, the fitting shape fitting with the bottom face of the joint at a connection face with the joint, and the member is connected by inserting into the groove of the joint and bonding.

Advantageous Effects of Invention

The present invention has the advantageous effect that the member can be positioned with high accuracy with respect to the preform.

DESCRIPTION OF EMBODIMENTS

An embodiment of the joint and aircraft structure according to the present invention is described below with reference to the accompanying drawings.

The joint according to the present embodiment is a so-called pi (π) shaped joint (hereafter, "pi-shaped joint") 20 (see FIG. 2) provided on a preform, and in which a groove is formed, a member being inserted into the groove, and is for connecting the preform and the member by bonding.

Figure 1:
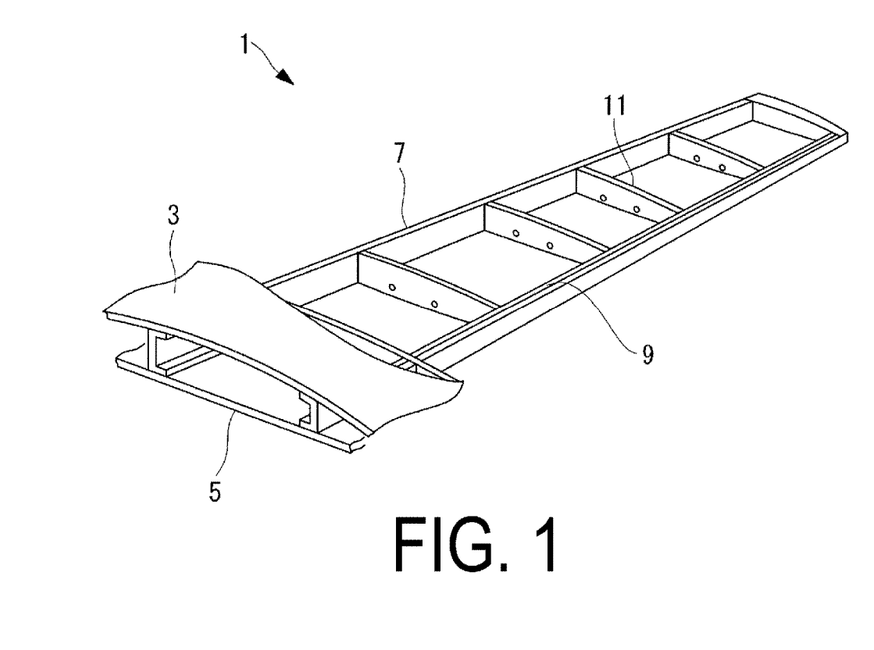
FIG. 1 is a perspective view illustrating a partially sectioned main wing of an aircraft.

FIG. 1 is a perspective view illustrating a partially sectioned main wing 1 of an aircraft.

The main wing 1 includes an upper skin 3, a lower skin 5, a forward spar 7, a rear spar 9, and a plurality of ribs 11.

The upper skin 3 and the lower skin 5 configure the outer shape of the main wing 1 and are thin plates also acting as aerodynamic surfaces. Along with the forward spar 7, the rear spar 9, and stringers (not illustrated), the upper skin 3 and the lower skin 5 partially bear tensile loads and compressive loads acting on the main wing 1.

As illustrated in FIG. 1, the forward spar 7 and the rear spar 9 are structural members that extend in the lengthwise direction of the main wing 1, and are disposed between the upper skin 3 and the lower skin 5.

A plurality of stringers, which are support members extending in the lengthwise direction of the main wing 1, is disposed on the inside face of the upper skin 3 or the lower skin 5, between the forward spar 7 and the rear spar 9.

As illustrated in FIG. 1, the ribs 11 are structural members extending in the widthwise direction of the main wing 1, and are disposed between the upper skin 3 and the lower skin 5. In other words, the ribs 11 are structural members extending in a direction roughly orthogonal to the forward spar 7 and the rear spar 9, and are plate-like members formed in the shape of the cross-sectional shape of the main wing 1.

Here, a pi-shaped joint 20 according to the present embodiment is used for example in the connection between the upper skin 3 and the forward spar 7 and the rear spar 9, the connection between the lower skin 5 and the forward spar 7 and the rear spar 9, the connection between the ribs 11 and the forward spar 7 and the rear spar 9, and the like. Note that the pi-shaped joint 20 may be used in structures other than the main wing 1 of an aircraft.

Figure 2:
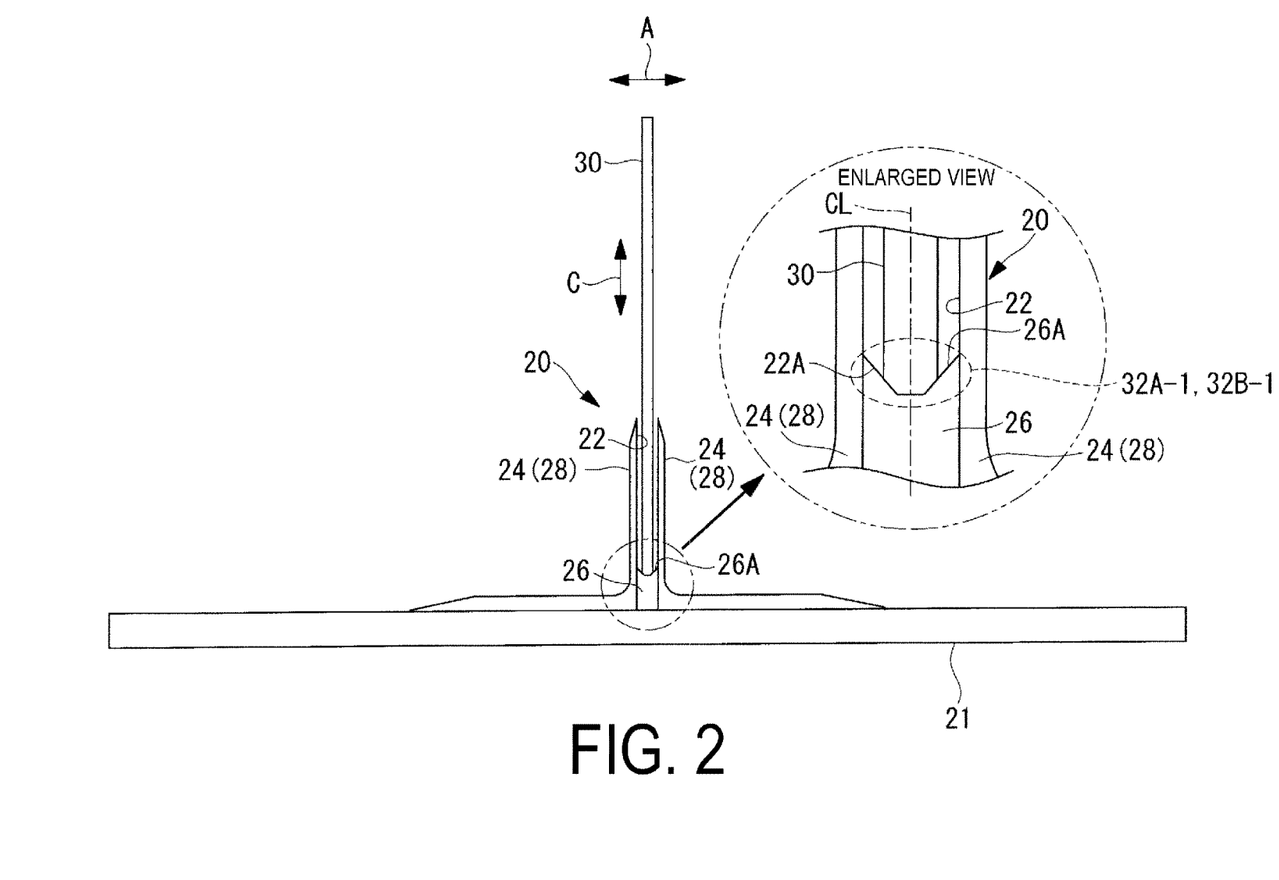
FIG. 2 is a side view illustrating the configuration of a pi-shaped joint according to an embodiment of the present invention.

FIG. 2 is a side view illustrating the configuration of the pi-shaped joint 20 according to the present embodiment The pi-shaped joint 20 provided on a preform 21 is configured from a main body member 24 in which a groove 22 is formed, and a positioning member 26 (also referred to as a filler) with fitting shapes 32A-1, 32A-2 (see also FIG. 3) formed on the top face 26A thereof.

The groove 22 of the pi-shaped joint 20 is formed by arranging two faces of a pair of L-shaped members 28 from which the main body member 24 is formed opposite each other, and configured so that the top face 26A of the positioning member 26 is the bottom face of the groove 22.

The pi-shaped joint 20 is, for example, used in the body structure of an aircraft as described above, and a member (a plate member 30 as an example in the present embodiment) that forms a part of the body structure is inserted into the groove 22. For example the forward spar 7 or the rear spar 9 is the preform 21, and the rib 11 is the plate member 30.

Also the bottom face of the inserted plate member 30 is connected to the top face 26A of the positioning member 26.

The fitting shapes 32A-1, 32A-2 (see also FIG. 3) which are described in detail later are formed in advance in the top face 26A of the positioning member 26, and the position of the plate member 30 is fixed in the desired position by the fitting shapes 32A-1, 32A-2. In other words, the positioning member 26 has the function of positioning the plate member 30.

Also, the plate member 30 is bonded to the pi-shaped joint 20 by filling the gap between the plate member 30 and the groove 22 with adhesive. On the other hand, the pi-shaped joint 20 is bonded to the preform 21 with adhesive. Note that there is no particular limitation on the method of bonding the preform 21 and the pi-shaped joint 20, and the method of bonding the pi-shaped joint 20 and the plate member 30.

In this way, the plate member 30 is bonded to the preform 21 by bonding using the pi-shaped joint 20, and without using fasteners.

The material of the pi-shaped joint 20, the preform 21, and the plate member 30 is a composite material, for example, carbon fiber reinforced plastic (CFRP) or the like. In CFRP, carbon fiber is used as a reinforcing material, and a synthetic resin is used as a matrix. Note that this is not a limitation, and a metal such as aluminum alloy may be used as the material of the pi-shaped joint 20, the preform 21, and the plate member 30.

As illustrated in the enlarged view in FIG. 2, in the pi-shaped joint 20 according to the present embodiment, the bottom face of the groove 22 (hereafter referred to as the "groove bottom face") is the top face 26A of the positioning member 26. Therefore, the fitting shape 32A-1 into which the plate member 30 fits is formed on the whole face of the groove bottom face.

In this way, the fitting shape 32A-1 is formed across the whole groove bottom face, so the plate member 30 is positioned in plane. In other words, the fitting shape 32A-1 positions the plate member 30 with respect to the width direction of the groove 22.

One example of the fitting shape 32A-1 according to the present embodiment is a shape formed symmetrically about the center line CL of the width of the groove 22 (hereafter, the "groove width") as axis, and in the example illustrated in FIG. 2 is a V-shape.

This V-shaped fitting shape 32A-1 is formed along the longitudinal direction of the groove 22.

Note that the whole face of the groove bottom face 22A includes substantially the whole face, but the fitting shape 32A-1 need not be formed in a portion of the groove bottom face 22A in the longitudinal direction. For example the fitting shape 32A-1 need not be formed near both ends in the longitudinal direction of the groove bottom face 22A, the fitting shape 32A-1 need not be formed near the center in the longitudinal direction of the groove bottom face 22A, and the fitting shape 32A-1 need not be formed at a plurality of locations in the longitudinal direction of the groove bottom face 22A.

A fitting shape 32B-1 corresponding to the fitting shape 32A-1 of the groove bottom face 22A is formed in the plate member 30 in the connecting face with the pi-shaped joint 20. In the example of FIG. 2, the fitting shape 32B-1 formed in the plate member 30 is also V-shaped. By making both fitting shapes 32A-1, 32B-1 V-shaped, the plate member 30 is smoothly fitted to the groove bottom face 22A.

Note that the fitting shape 32A-1 is formed so that the plate member 30 is positioned in a prescribed position with respect to the groove width.

The prescribed position is a position such as, for example, the center in the groove width, in which the plate member 30 does not contact the two faces of the L-shaped members 28 that form the groove 22. When the plate member 30 contacts the two faces of the L-shaped members 28 that form the groove 22, it is not possible to uniformly fill with adhesive on both sides of the plate member 30.

Figure 3:
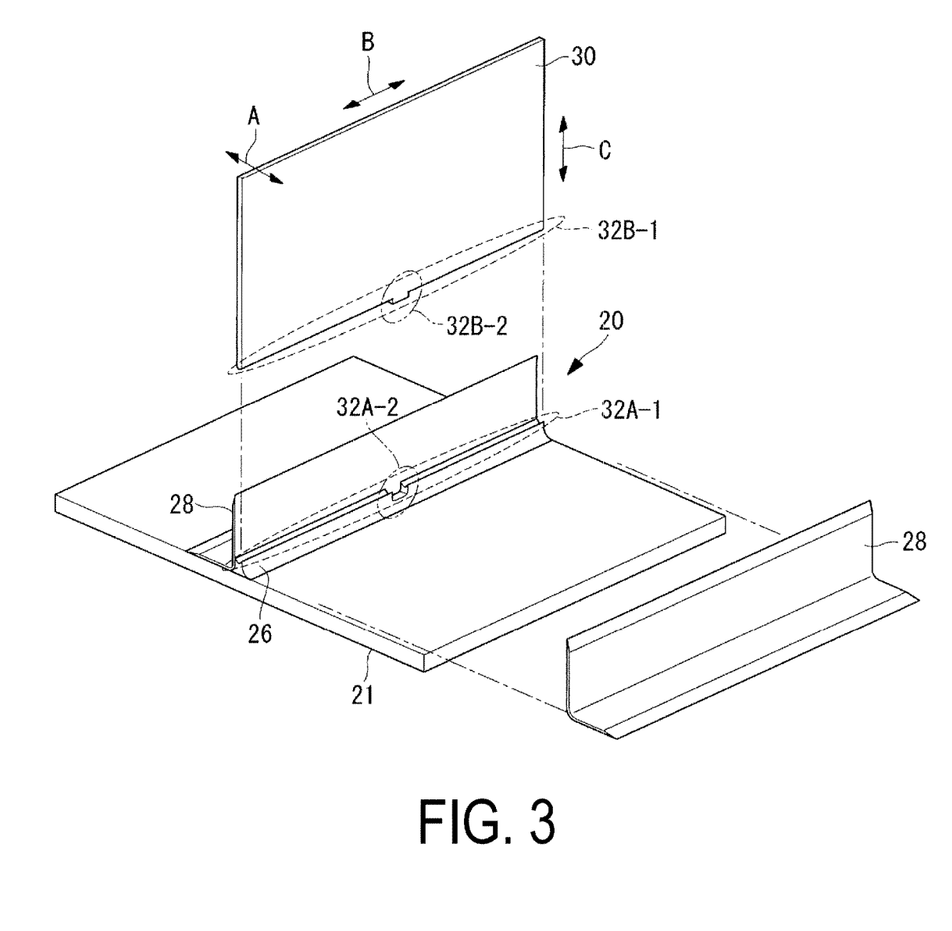
FIG. 3 is a perspective view illustrating the configuration of a pi-shaped joint according to an embodiment of the present invention.

FIG. 3 is a perspective view illustrating the configuration of the pi-shaped joint 20 according to the present embodiment.

As illustrated in FIG. 3, a fitting shape 32A-2 into which the plate member 30 fits is formed in a portion of the groove bottom face 22A of the pi-shaped joint 20 according to the present embodiment. One example of the fitting shape 32A-2 according to the present embodiment is a slot shape.

In this way, the fitting shape 32A-2 is formed in a portion of the groove bottom face 22A, so the plate member 30 is positioned at a point. In other words, the fitting shape 32A-2 is at a reference position for positioning the plate member 30 with respect to the longitudinal direction of the groove 22, and positions the plate member 30 with respect to the longitudinal direction of the groove 22.

On the other hand, a fitting shape 32B-2 into which the fitting shape 32A-2 fits is formed in the plate member 30. The fitting shape 32B-2 according to the present embodiment has a protrusion shape that can fit with the fitting shape 32A-2.

Also the fitting shapes 32A-1, 32A-2 of the groove bottom face 22A fit with the fitting shapes 32B-2, 32B-2 of the plate member 30. In this way, the plate member 30 is fitted in a position that coincides with the fitting shapes 32A-1, 32A-2 of the groove bottom face 22A.

Note that as an example there is one each of the fitting shapes 32A-2, 32B-2 illustrated in FIG. 3, but this is not a limitation, and for example two or more may be formed at equal intervals. In addition, as one example the fitting shapes 32A-2, 32B-2 are formed substantially in the center in the longitudinal direction of the groove 22, but this is not a limitation, and for example they may be formed near an end of the groove 22.

In the example of FIG. 3, the L-shaped members 28 (main body member 24) and the positioning member 26 are separately configured, but the L-shaped members 28 (main body member 24) and the positioning member 26 may be formed integrally. Note that there is no particular limitation on the method of forming the L-shaped members 28 and the positioning member 26 from which the pi-shaped joint 20 is configured.

As described above, the pi-shaped joint 20 according to the present embodiment is provided on the preform 21, the groove 22 in which the plate member 30 is inserted is formed therein, and by bonding to the preform 21 and the plate member 30 connects the preform 21 and the plate member 30. Moreover, the fitting shape 32A-1 into which the plate member 30 fits is formed on the pi-shaped joint 20 on the whole groove bottom face 22A. Additionally, the fitting shape 32A-2 into which the plate member 30 fits is formed in a portion of the groove bottom face 22A.

On the other hand, the fitting shapes 32B-1, 32B-2 that fit with the groove bottom face 22A formed in the pi-shaped joint 20 are formed on the plate member 30 at the joining face with the pi-shaped joint 20.

Therefore, the pi-shaped joint 20 according to the present embodiment can arrange the plate member 30 in the required position with respect to the groove width using the fitting shape 32A-1 of the groove bottom face 22A. In other words, the plate member 30 is positioned with high accuracy with respect to the groove width (the direction A in FIGS. 2 and 3) using the fitting shape 32A-1 of the groove bottom face 22A.

Also, the pi-shaped joint 20 according to the present embodiment positions the plate member 30 with high accuracy with respect to the longitudinal direction of the groove 22 (the direction B of FIG. 3) using the fitting shape 32A-2 of the groove bottom face 22A.

Also, by just inserting the plate member 30 into the pi-shaped joint 20 according to the present embodiment towards the groove bottom face 22A, the plate member 30 is positioned with high accuracy with respect to the vertical direction of the groove 22 (the direction C of FIGS. 2 and 3).

Also, the pi-shaped joint 20 according to the present embodiment prevents the plate member 30 from being connected to the pi-shaped joint 20 at an inclination by fitting with the plate member 30 using the fitting shapes 32A-1, 32A-2.

Furthermore, the fitting shapes 32A-1, 32A-2 are formed in advance on the pi-shaped joint 20, and the fitting shapes 32B-1, 32B-2 are formed in advance on the plate member 30. Therefore, by just inserting the plate member 30 into the pi-shaped joint 20, the plate member 30 can be positioned, so compared with the conventional method in which for example a positioning peg is used, the process of assembling the structure can be simplified, and the time required for assembly can be shortened.

First Modification

Hereinafter, a first modification of the present invention will be described.

Figure 4:
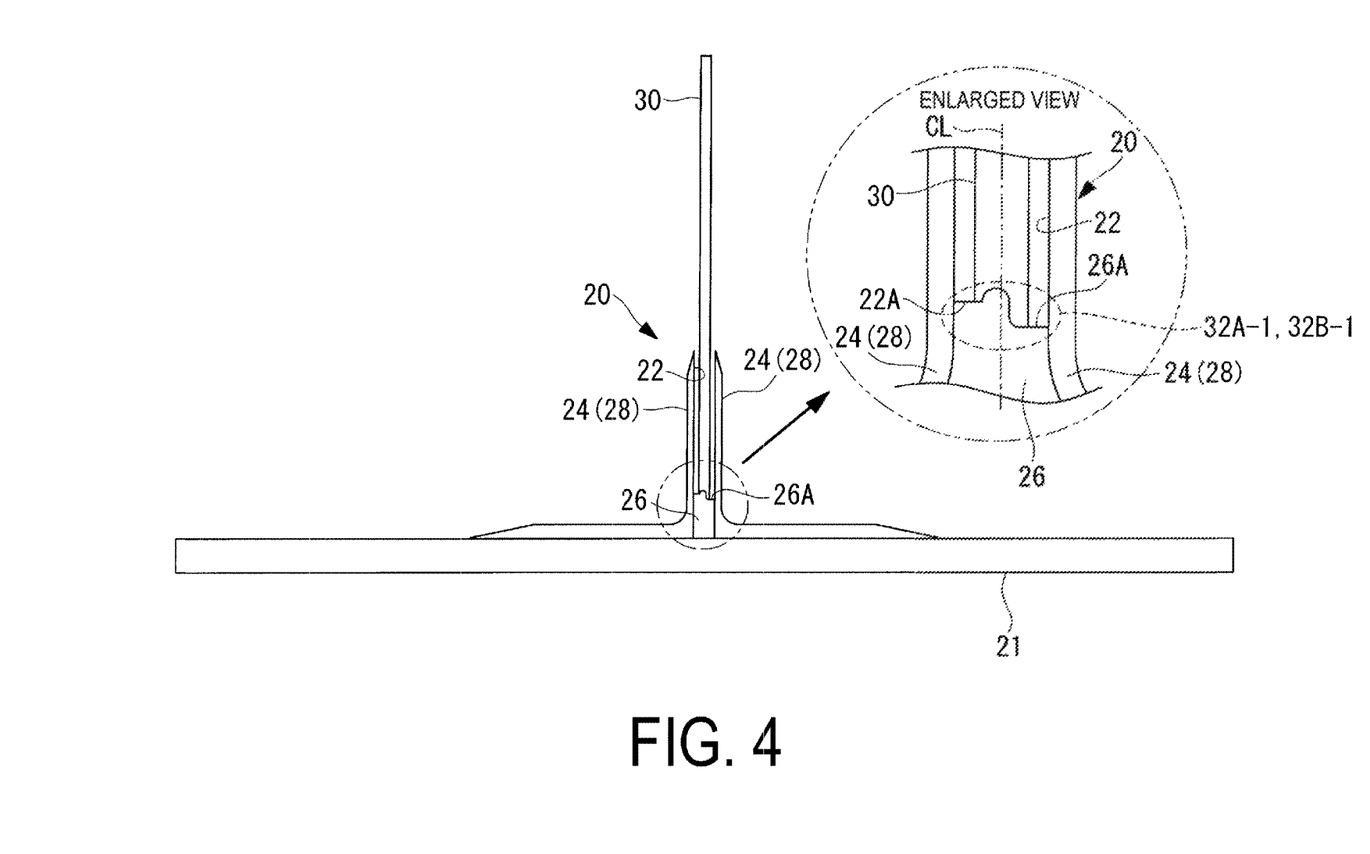
FIG. 4 is a side view illustrating the configuration of a pi-shaped joint according to a first modification of the present invention.

FIG. 4 is a side view of the pi-shaped joint 20 according to a first modification of the present invention. Note that constituent parts in FIG. 4 that are the same as in FIG. 2 are given the same reference signs as in FIG. 2, and their description is omitted.

The fitting shape 32A-1 of the groove bottom face 22A according to the first modification is formed asymmetrically about the center line CL of the groove width as axis.

As illustrated in FIG. 4, in the first modification, the fitting shape 32A-1 is formed in a circular arc-shaped (radiused shape) protrusion in substantially the center, and on the two sides thereof is formed in a flat shape with different heights.

On the other hand, a circular arc-shaped recess with flat shapes with different heights on the two sides thereof is formed in the plate member 30 as the fitting shape 32B-1 into which the fitting shape 32A-1 fits.

Second Modification

Hereinafter, a second modification of the present invention will be described.

Figure 5:
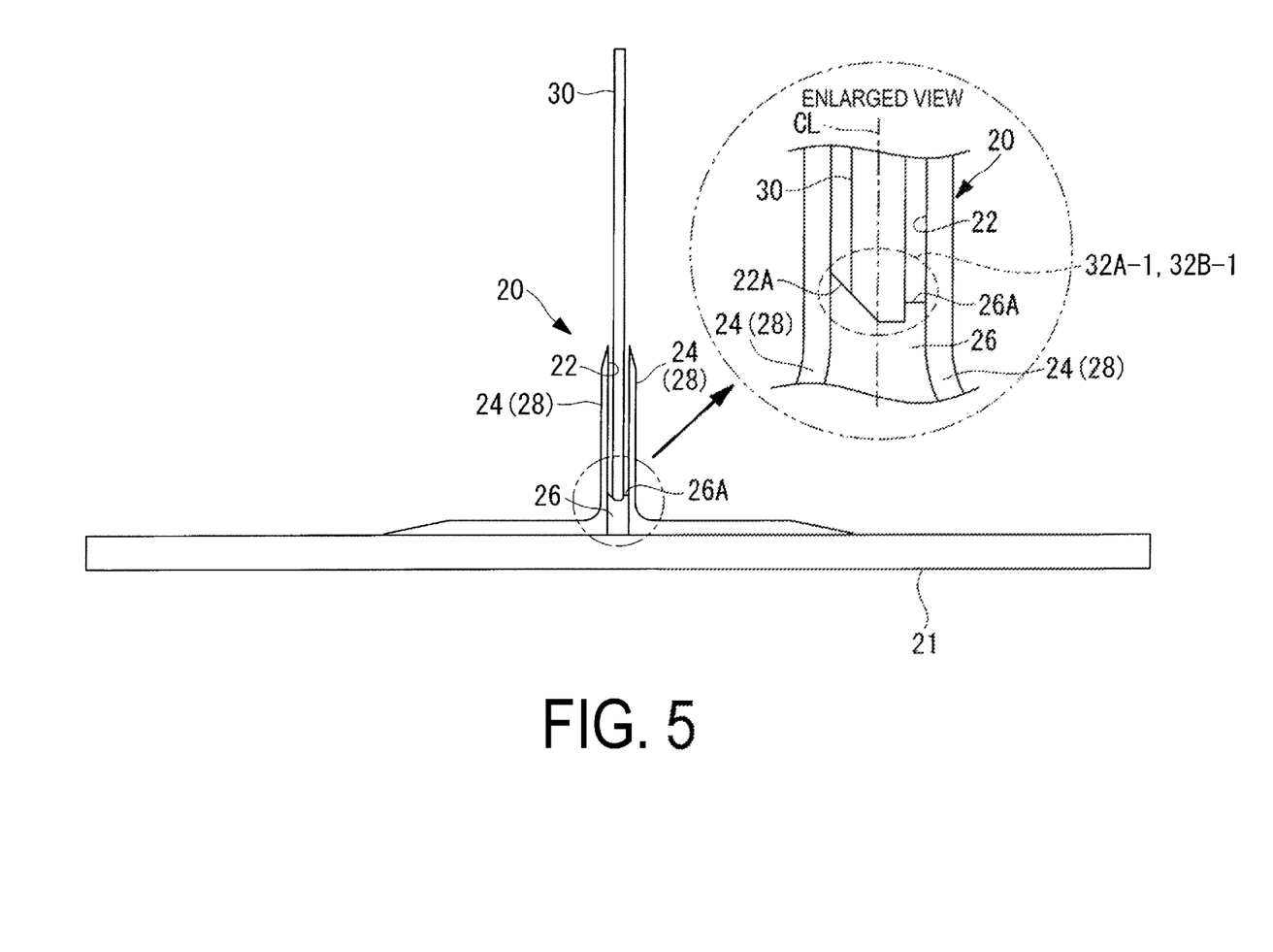
FIG. 5 is a side view illustrating the configuration of a pi-shaped joint according to a second modification of the present invention.

FIG. 5 is a side view of the pi-shaped joint 20 according to the second modification of the present invention. Note that constituent parts in FIG. 5 that are the same as in FIG. 2 are given the same reference signs as in FIG. 2, and their description is omitted.

The fitting shape 32A-1 of the groove bottom face 22A according to the second modification is formed asymmetrically about the center line CL of the groove width as axis.

As illustrated in FIG. 5, in the second modification, a slanting face (tapered shape) is formed on a first side of the fitting shape 32A-1, and a flat shape with a step is formed on a second side.

On the other hand, a slanting face is formed on one side, and a flat shape with a step is formed on a second side in the plate member 30 as the fitting shape 32B-1 into which the fitting shape 32A-1 fits.

Third Modification

Hereinafter, a third modification of the present invention will be described.

Figure 6:
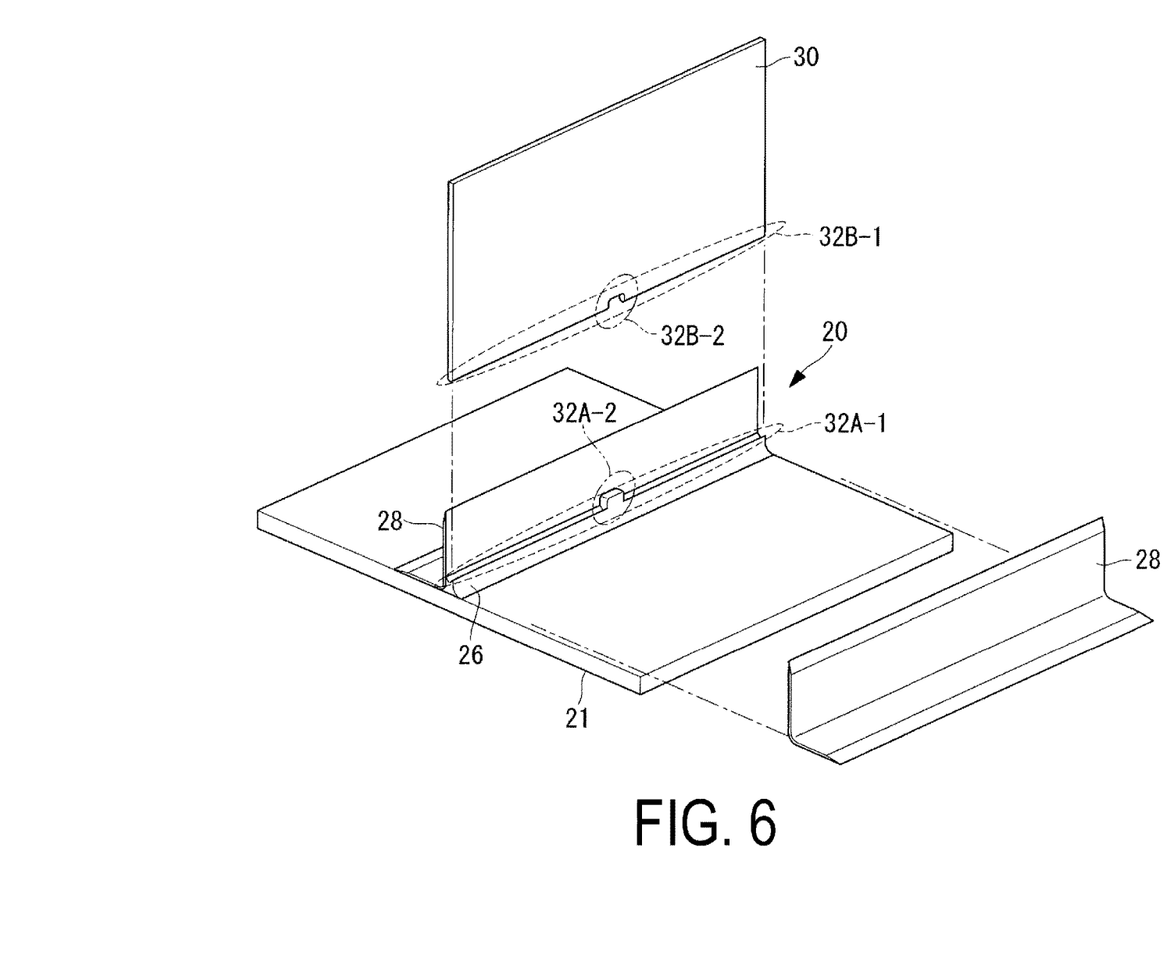
FIG. 6 is a perspective view illustrating the configuration of a pi-shaped joint according to a third modification of the present invention.

FIG. 6 is a side view of the pi-shaped joint 20 according to the third modification of the present invention. Note that constituent parts in FIG. 6 that are the same as in FIG. 3 are given the same reference signs as in FIG. 3, and their description is omitted.

As illustrated in FIG. 6, in the pi-shaped joint 20 according to the third modification, a protrusion shape is formed in the positioning member 26 as the fitting shape 32A-2.

On the other hand, a slot shape is formed in the plate member 30 as the fitting shape 32B-2 into which the fitting shape 32A-2 fits.

The present invention has been described using the above embodiments, but the technical scope of the present invention is not limited to the scope of the embodiments as described above. Various modifications or improvements can be made to the embodiments as described above within the range that does not deviate from the intent of the invention, and these forms to which the modifications or improvements have been added are also included within the technical scope of the present invention.

For example, in the embodiments as described above, the pi-shaped joint 20 was described for a form used in an aircraft structure, but the present invention is not limited to this, and the pi-shaped joint 20 may be a form that is used in structures other than an aircraft.

Also, in the embodiments as described above, a form was described in which the fitting shape 32A-1 and the fitting shape 32A-2 are formed in the positioning member 26, and the fitting shape 32B-1 and the fitting shape 32B-2 are formed in the plate member 30, but the present invention is not limited to this. For example, the fitting shape 32A-1 only may be formed in the positioning member 26, and the fitting shape 32B-1 only may be formed in the plate member 30.

REFERENCE SIGNS LIST

1 Main wing
20 Pi-shaped joint
21 Preform
22 Groove
24 Main body member
26 Positioning member
30 Plate member
32A-1 Fitting shape
32A-2 Fitting shape
32B-1 Fitting shape
32B-2 Fitting shape

The invention claimed is:

1. A joint provided on a preform and for connecting the preform and a member by bonding, the joint comprising:
   a groove formed therein into which the member is inserted;
   a pair of first portions arranged opposite to each other, opposite faces thereof forming both sides of the groove;
   a second portion arranged between the pair of the first portions and forming a bottom face of the groove; and
   a first fitting shape into which the member fits, and that is formed entirely on a face forming the bottom face of the groove, wherein
   the first fitting shape is formed asymmetrically with respect to a center line of a width of the groove.

2. The joint according to claim 1, wherein a second fitting shape into which the member fits is formed on a portion of the bottom face of the groove.

3. The joint according to claim 1, wherein the first fitting shape is formed so that the member is positioned in a prescribed position with respect to the width of the groove.

4. The joint according to claim 1, further comprising:
   a main body member in which the groove is formed, wherein
   the second portion is a positioning member having the first fitting shape formed on a top face thereof,
   the positioning member is arranged in the main body member so that the top face thereof is the bottom face of the groove, and the member is connected at the top face.

5. An aircraft structure, comprising:
   the joint described in claim 1, wherein
   the member includes a fitting shape, the fitting shape fitting with the bottom face of the groove at a connection face with the joint,
   the member being inserted into the groove of the joint and connected to the groove of the joint by bonding.

6. A joint provided on a preform and for connecting the preform and a member by bonding, the joint comprising:
   a groove formed therein into which a member is inserted;
   a pair of first portions arranged opposite to each other, opposite faces thereof forming both sides of the groove;
   a second portion arranged between the pair of the first portions and forming a bottom face of the groove; and
   a first fitting shape being formed in a face forming the bottom face of the groove, to position the member with respect to a width direction of the groove, wherein the first fitting shape is formed asymmetrically with respect to a center line of a width of the groove.

7. The joint according to claim 6, wherein a second fitting shape is formed on the bottom face of the groove to position the member with respect to a longitudinal direction of the groove.

8. An aircraft structure, comprising:
the joint described in claim 6, wherein
the member includes a fitting shape, the fitting shape fitting with the bottom face of the groove at a connection face with the joint,
the member being inserted into the groove of the joint and connected to the groove of the joint by bonding.

* * * * *